United States Patent [19]

Roche

[11] Patent Number: 4,609,822
[45] Date of Patent: Sep. 2, 1986

[54] RUGGED INTERFEROMETER

[75] Inventor: Aiden E. Roche, Palo Alto, Calif.

[73] Assignee: Lockheed Missiles & Space Company, Inc., Sunnyvale, Calif.

[21] Appl. No.: 668,139

[22] Filed: Nov. 5, 1984

[51] Int. Cl.[4] .............................................. G01B 9/02
[52] U.S. Cl. .................................. 250/352; 250/339; 356/352
[58] Field of Search ....................... 250/338, 352, 339; 350/1.1, 1.6; 356/352

[56] References Cited

PUBLICATIONS

William Wolfe, editor, "Handbook of Military Infrared Technology", Office of Naval Research, 1965, pp. 288–289.
Roche, "Tilt Tunable Ultra Narrow–Band Filters for High Resolution Infrared Photometry", Applied Optics, 14 (3) Mar. 1975, pp. 765–770.
Roche, "Solid Fabry–Perot Etalons as High Resolution Infrared Interferometers", Proc. Soc. Photo–Optical Instr. Eng., SPIE, 95, 1976, pp. 196–203.
Roche et al, "Performance Analysis for the Cryogenic Etalon on the Upper–Atmospheric Research Satellite", Proc. Soc. Photo–Optical Instr. Eng., 364, 1982, pp. 46–55.
Roche et al, "Telescope–Optical System Performance Analysis for the Cryogenic Limb Array Etalon Spectrometer (CLAES) on the Upper Atmospheric Research Satellite; Proc. Soc. Photo–Optical Instru. Eng., 430, Nov. 23, 1983, pp. 106–114.

Primary Examiner—Carolyn E. Fields
Attorney, Agent, or Firm—John J. Morrissey

[57] ABSTRACT

A rugged Fabry-Perot interferometer comprises a solid etalon (15) made of single-crystal silicon with precisely parallel stacks (13) and (14) of dielectric materials coated on opposite sides thereof. The stacks (13) and (14) are identical to each other, and each stack comprises a plurality of layers of different materials having alternately high and low indices of refraction. A dielectric ring (30) made of the same material as the etalon (15) is bonded to a peripheral portion of one side of the etalon (15) by an epoxy material having the same coefficient of thermal expansion as the ring (30) and the etalon (15). The ring (30) with the etalon (15) bonded thereto is kinematically mounted on Teflon contact members (34) within an annular receiving structure (31) made of a metal (such as copper) of high thermal conductivity. Teflon contact members (39) on spring members (37), which are secured to the receiving structure (31), bear compressively against a peripheral portion of the other side of the etalon (15) to secure the etalon (15) within the receiving structure (31). Thermal equilibrium between the etalon (15) and the receiving structure (31) is provided by copper braids (40).

15 Claims, 6 Drawing Figures

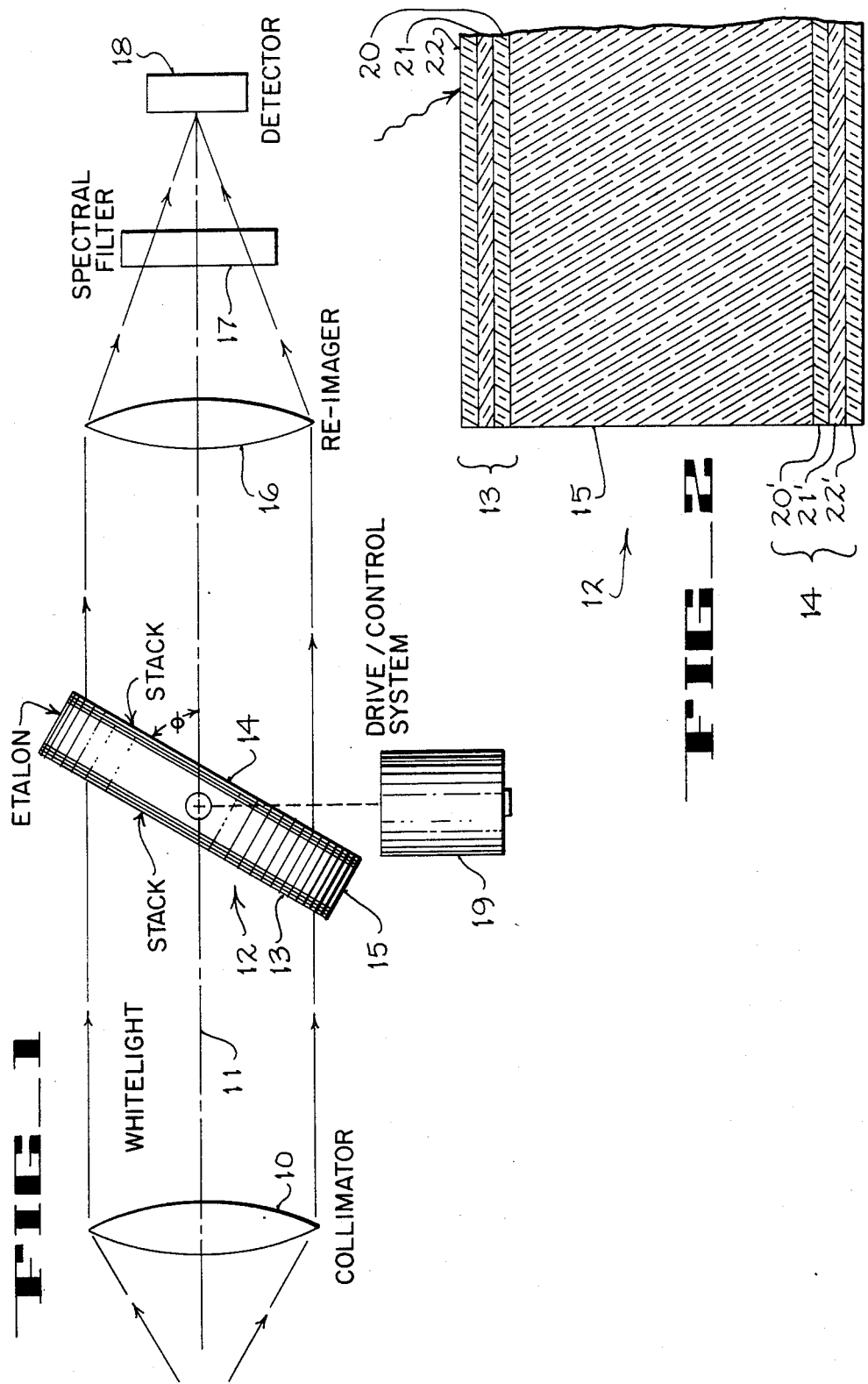

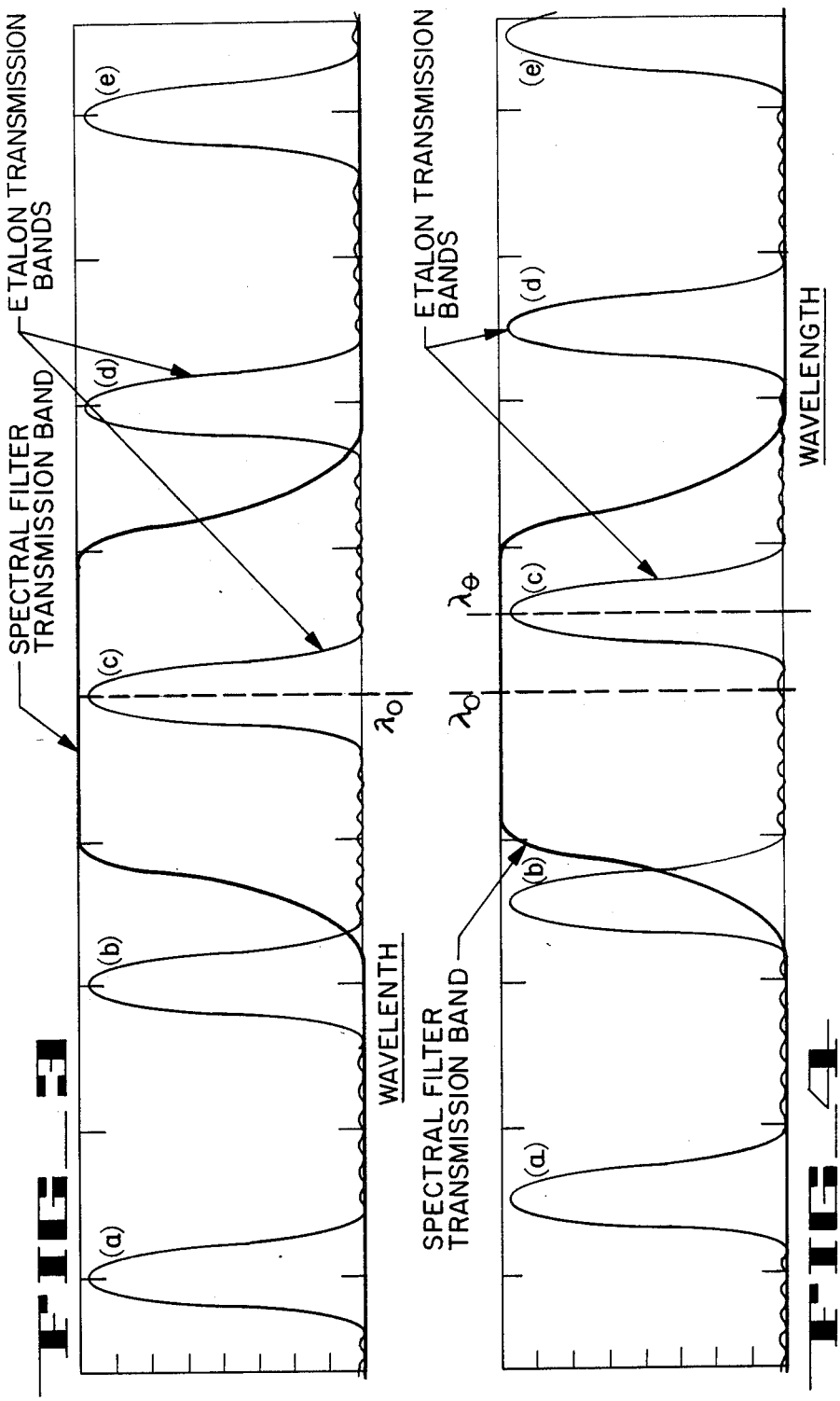

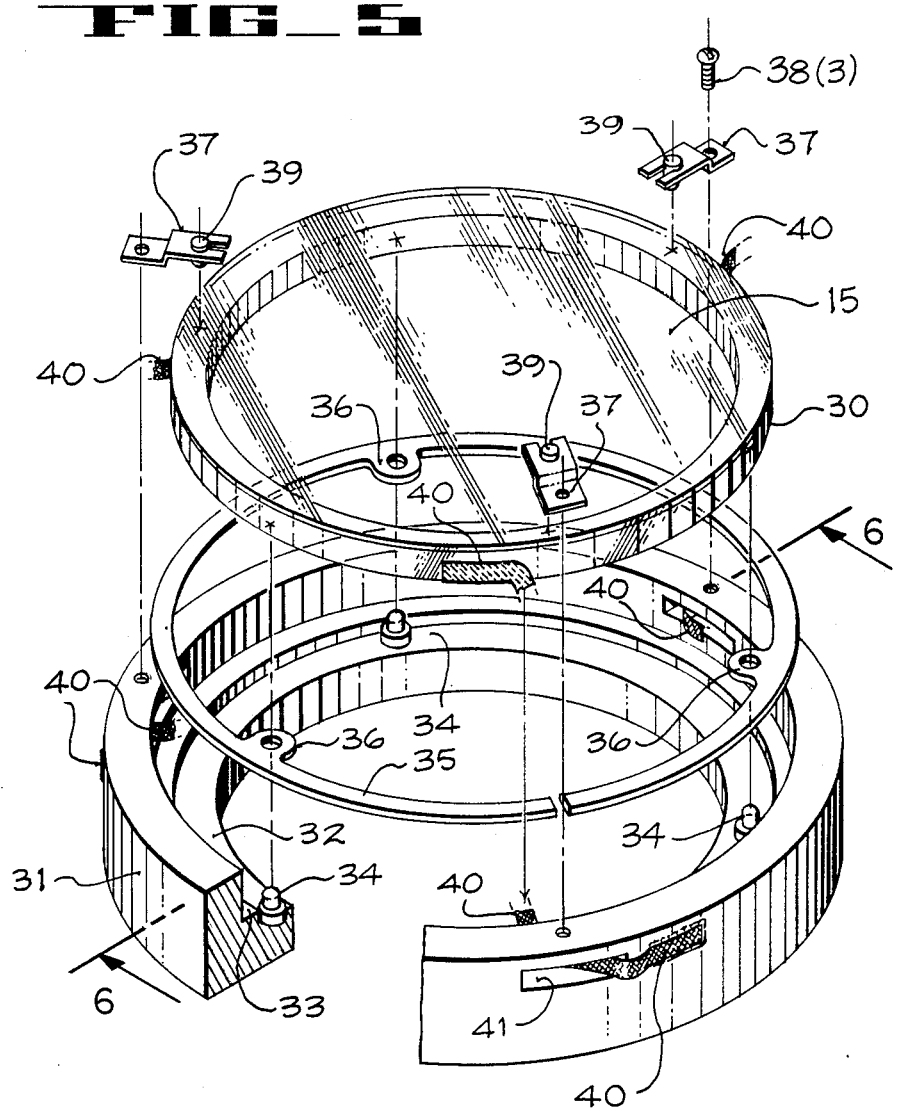
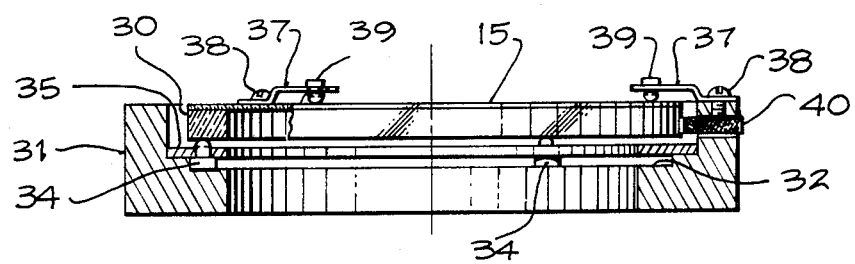

RUGGED INTERFEROMETER

TECHNICAL FIELD

This invention pertains generally to interferometry, and more particularly to a rugged interferometer of the Fabry-Perot type that is capable of withstanding stresses of a rocket launch and capable of operating in a thermal regime ranging from ambient terrestrial temperatures to cryogenic temperatures.

BACKGROUND ART

Transparent crystals have been suggested for use as solid etalons for separating stacks of dielectric layers in Fabry-Perot interferometers. See, e.g., A. E. Roche, "Solid Fabry-Perot Etalons as High Resolution Infrared Interferometers", *Proceedings of the Society of Photo-Optical Instrumentation Engineers*, Vol. 95, (1976), pp. 196–203; A. E. Roche et al., "Performance Analysis for the Cryogenic Etalon Spectrometer on the Upper Atmospheric Research Satellite", *Proceedings of the Society of Photo-Optical Instrumentation Engineers*, Vol. 364, (1982), pp. 46–58.

For upper atmospheric research involving measurements in the infrared spectral region from about 3.5 microns to 15 microns, crystals of zinc sulfide, zinc selenide, germanium and silicon are sufficiently transparent to function as solid etalons for Fabry-Perot interferometers. Pure silicon crystal is particularly suitable in terms of optical stability and optical throughput for use as a solid etalon in infrared interferometry. Nevertheless, silicon crystal has not heretofore been used as a solid etalon in infrared interferometric applications requiring that the etalon be able to withstand stresses of a rocket launch, and be able to operate in a temperature-cycling environment in which the temperatures range from ambient terrestrial temperatures (e.g., approximately 300° K.) to cryogenic temperatures (e.g., below 50° K.).

Pure silicon crystal is quite fragile, and could not survive the mechanical stresses involved in a rocket launch nor the stresses involved in extreme temperature cycling, unless it is properly mounted to withstand such stresses. Until the present invention, no effective technique was available for mounting an interferometric apparatus comprising a solid etalon made of pure silicon crystal in an interferometer designed to be launched by rocket into the upper atmosphere.

SUMMARY OF THE INVENTION

The present invention provides an interferometer for producing a series of spectrally narrow channels of electromagnetic radiation centered on a selected infrared wavelength, which interferometer comprises a solid etalon made of a pure crystal capable of transmitting intermediate to long infrared wavelengths (i.e., 3.5 microns to 15 microns) with a throughput greater than 60%.

In accordance with the present invention, the solid etalon can be made of pure silicon crystal, and is mounted so as to withstand the stresses inherent in a rocket launch and also the stresses associated with rapid thermal cycling through a temperature range extending from ambient terrestrial temperatures to cryogenic temperatures (near absolute zero).

DESCRIPTION OF THE DRAWING

FIG. 1 is a schematic view of an interferometer of the Fabry-Perot type comprising a solid etalon of single-crystal silicon mounted according to the present invention.

FIG. 2 is a cross-sectional view of the solid etalon of the interferometer of FIG. 1 wherein stacks of dielectric layers coated on either side of the etalon are illustrated with exaggerated thicknesses.

FIG. 3 is a graphical representation of a portion of a spectral pattern produced by the interferometer of FIG. 1 when tuned to a selected wavelength $\lambda_o$.

FIG. 4 is a graphical representation of another portion of the spectral pattern shown in FIG. 3, which is produced by tuning the interferometer to a wavelength $\lambda_\theta$ shorter than $\lambda_o$.

FIG. 5 is an exploded view of the etalon and mounting structure of the interferometer of FIG. 1.

FIG. 6 is a cross-sectional view as seen along line 6—6 of FIG. 5.

BEST MODE OF CARRYING OUT THE INVENTION

An interferometer according to the present invention is schematically illustrated in FIG. 1. Light from a distant source is collimated by a conventional collimator 10 into a beam of light that emerges parallel to an axis 11, which is the optic axis of the interferometer. The collimated beam impinges upon a Fabry-Perot interferometric device 12, which comprises two precisely parallel stacks 13 and 14. The two stacks are made of dielectric materials coated upon opposite sides of a solid etalon 15. The etalon 15 serves as a substrate for supporting the stacks 13 and 14.

The etalon 15 separates the stacks 13 and 14 from each other by a precise distance. It is this distance which determines spectral characteristics of the apparatus. Separation of interference rings is one of those characteristics that is seen in an interference pattern. Light that is transmitted through the device 12 is converged by a conventional re-imager 16 through a conventional spectral filter 17 to a conventional detector 18. Only wavelengths in a selected bandpass region are transmitted.

The device 12 is disposed so as to have only one degree of freedom, viz., freedom to rotate about an axis perpendicular to the optic axis 11. Rotation of the device 12 through a range of angles $\theta$ is measured and controlled by means of a drive/control system 19.

The etalon is made of a dielectric material that is sufficiently transparent at the wavelengths of interest so that they are readily sensed by the detector 18. For infrared interferometry in the upper atmosphere, a suitable material for the etalon 15 is single-crystal silicon, which has a throughput of greater than 60% for wavelengths in the region from 3.5 microns to 15 microns. The two sides of the etalon 15 must be parallel to each other to within a proper fraction (if possible, to within one one-hundredth) of a selected wavelength $\lambda_o$.

The two sides of the etalon are polished to function as reflecting surfaces. The thickness of the etalon 15 must be an integral multiple of half-wavelengths of $\lambda_o$. Silicon crystals of this kind are available from, e.g., Perkin-Elmer Corporation of Norwalk, Connecticut.

The stacks 13 and 14 are substantially identical to each other, and each stack comprises a plurality of layers of different dielectric materials having alternately high and low indices of refraction. The etalon 15 with the stacks 13 and 14 coated thereon is schematically illustrated in FIG. 2 wherein the layers comprising each of the stacks 13 and 14 are shown with exaggerated thicknesses. Thus, the stack 13 is shown comprising a layer 20 made of a material such as zinc sulfide or zinc selenide with a low index of refraction (i.e., lower than 1.7), a layer 21 made of a material such as silicon or germanium with a high index of refraction (i.e., greater than 3.5), and a layer 22 made of a material with a low index of refraction. Usually, there would be four to six layers of alternately high and low index of refraction in each of the stacks 13 and 14. The internal reflecturity provided by each of the stacks 13 and 14 has a value greater than 90%.

Corresponding layers 20′, 21′ and 22′ coated one-over-the-other upon the opposite side of the etalon 15 to form stack 14 are also shown in FIG. 2. Layer 20′ is made of the same material as layer 20; layer 21′ is made of the same material as layer 21; and layer 22′ is made of the same material as layer 22. There would usually be one or more additional layers coated successively over the layer 22′ corresponding to additional layers coated over the layer 22. Each layer in each of the stacks 13 and 14 has a thickness that is precisely one-quarter of the wavelength $\lambda_o$ centered in the wavelength region of interest. The layers in the stacks 13 and 14 are coated onto the etalon 15 with the required dimensional accuracy by conventional vapor deposition or a sputtering technique.

In operation of the interferometer, light impinging upon the interferometric device 12 is reflected by the polished surface thereof back into the stack 13. However, the alternating high and low indices of refraction of the successive layers in the stack 13 cause a portion of each quantity of light energy reflected into the stack 13 to return to the etalon 15 for transmission therethrough to the polished reflecting surface upon which the stack 14 is coated. From a quantum-mechanical standpoint, the etalon 15 with the stacks 13 and 14 coated on opposite sides thereof can be viewed as a resonator that eventually fills with light energy. Finally, light energy passes from the "filled" etalon 15 through the stack 14 to the re-imager 16. However, from a classical wave-mechanical standpoint, there is an interference between the wavefronts proceeding from the device 12. This interference is manifested as a pattern in the form of a series of equally spaced fringes or transmission bands.

The wavelengths of the transmission bands in the interference pattern at the detector 18 are determined for a given orientation of the device 12 relative to the optic axis 11 as specified by the angle $\theta$. With reference to FIG. 3, the transmission bands produced by the device 12 are shown (as is typical) as spectrally narrow channels a, b, c, d, e, . . . in the wavelength region of interest. The channels a, b, c, d, e, . . . are of uniform intensity (as represented by the height of the curve representing each channel), and are equally spaced from each other as determined by the thickness of the etalon 15.

The spectral filter 17 effectively blocks transmission of all wavelengths outside a selected bandpass region of the spectrum, where the bandpass region is centered on the wavelength $\lambda_o$. The bandpass region of the spectral filter 17 is relatively broad in comparison with the transmission band of each of the channels, a, b, c, d, e, . . . produced by the device 12. In FIG. 3, the bandpass region of the spectral filter 17 is shown superimposed upon the interference pattern comprising the channels a, b, c, d, e, . . . , and is seen to isolate the channel c containing wavelength $\lambda_o$ from the entire series comprising channels a, b, c, d, e, . . . .

When the angle $\theta$ changes to a larger value, the wavelengths at which the transmission bands (i.e., the fringes) a, b, c, d, e, . . . occur shift to lower wavelengths by a corresponding amount. This shift to lower wavelengths is illustrated graphically in FIG. 4. It is seen there that the center channel no longer occurs at $\lambda_o$, but rather at a wavelength $\lambda\theta$ displaced from $\lambda_o$. As the channel c moves away from the center of the passband region of the spectral filter 17, the adjacent channel b is seen to move into the passband region. Thus, by controllably rotating the device 12, particular fringes in the interference pattern produced by the transmission through the separated stacks 13 and 14 can be isolated and examined.

Successful operation of an interferometer comprising the device 12 requires a mounting for the etalon 15 that substantially precludes any motion thereof, other than as permitted by the drive/control system 19. When an interferometer comprising the device 12 is to operate in the upper atmosphere, the etalon 15 must be mounted so as to withstand the stresses inherent in a rocket launch, and so as to withstand rapid temperature cycling through a range extending from ambient terrestrial temperatures (i.e., approximately 300° K.) to cryogenic temperatures below 50° K. A mounting technique for the etalon 15 designed to meet the exacting requirements of the upper atmosphere is illustrated in FIG. 5.

In discussing the mounting of the etalon 15 in the interferometric device 12, the stacks 13 and 14 of layers of dielectric materials on opposite sides of the etalon 15 can be ignored, because the thicknesses of the stacks 13 and 14 are insignificant in comparison with the thickness of the etalon 15 with respect to mechanical operation, even if not insignificant with regard to spectral operation. As shown in exploded perspective view in FIG. 5, a dielectric ring 30 is bonded to a peripheral portion of one side of the etalon 15. The ring 30 is made of precisely the same material as the etalon 15, but has a thickness that is at least 1000 times greater than the etalon. Since the ring and the etalon are made of the same material, they both have the same coefficient of thermal expansion. Bonding of the ring 30 to the etalon 15 is accomplished by means of a commercially available epoxy material, which can be custom-tailored to have substantially the same coefficient of thermal expansion as the ring 30 and the etalon 15.

The etalon 15 and the ring 30 are housed within an annular receiving structure 31 made of a metal such as copper, which has a high thermal conductivity. The receiving structure 31 has internal ledges 32 and 33 which extend inwardly toward the center of the receiving structure, and which are stepped with respect to each other. Three substantially identical contact members 34 are positioned on the more inwardly extending of the two stepped ledges (i.e., on the ledge 32), and are substantially equally spaced from each other. Each of the contact members is configured as a bolt having a flat head portion and a threadless shank portion. The head portion of each contact member is supported by the ledge 32 in such a way that the shank portion of the contact member 34 projects perpendicularly away from the ledge 32. The head portion of each contact member 34 has a thickness substantially equal to the distance between the ledge 33 and the ledge 32.

A retaining ring 35 is received within the receiving structure 31, and is dimensioned to lie on the ledge 33. The retaining ring 35 has three inwardly extending eyelets 36, which are equally spaced with respect to each other. When the retaining ring 35 is lying on the ledge 33 of the receiving structure 31, the shank portion of each one of the contact members 34 extends through a corresponding one of the eyelets 36 of the retaining ring 35. The distal end of the shank portion of each contact member 34 is hemispherically shaped, and projects through the corresponding eyelet of the retaining ring 35. The retaining ring 35 is made of the same metal as the receiving structure 31, and is bonded thereto by epoxy or by a metallurgical weldment.

The ring 30 with the etalon 15 fastened to one side thereof is positioned within the receiving structure 31 so that the side of the ring 30 not fastened to the etalon 15 is in contact with the three contact members 34. The ring 30 is dimensioned so as to be spaced apart from the inner surface of the receiving structure 31 when making contact with the three contact members 34. The contact members are made of a flexible thermally insulative material, which is chemically stable under rapid temperature cycling through a broad range of temperatures. The preferred material for the contact members 34 is polytetrafluoroethylene (Telfon ™). Fungible contact members 34 can be made from Teflon.

The hemispherical shape of the distal ends of the shank portions of the contact members assures that the contact between each contact member 34 and the ring 30 is substantially a point contact. Thus, the ring 30 is kinematically mounted on the ledge 32 of the receiving structure 31.

Three elongate spring members 37 (which are secured by screws 38 to the annular receiving structure 31) provide a means for mounting the ring 30 and the etalon 15 within the receiving structure 31 in a manner that precludes any unsymmetrical movement of the ring with respect to the receiving structure 31. As shown in FIGS. 5 and 6, a proximal end of each spring member 37 is secured to a cylindrical end of the receiving structure 31 so that each spring member 37 extends inwardly over the etalon 15 without touching the etalon 15. A distal end of each of the spring members is notched to receive a contact member 39. The three contact members 39 are preferably configured identically to the contact members 34, and are likewise made of a flexible thermally insulative material such as Teflon.

The spring members 37 extend over the etalon 15 sufficiently so that the contact members 39 are positioned to make compressive contact with the etalon 15 at three points within a peripheral portion on the side of the etalon 15 opposite the peripheral portion on the other side thereof to which the ring 30 is fastened. The contact members 39 are rotationally offset by 90° with respect to the contact members 34 on opposite sides of the etalon 15. When the screws 38 are tightened, the spring members 37 cause the contact members 39 to bear compressively against the peripheral portion of the etalon 15, which is reinforced by the ring 30.

Thermal contact (and thus thermal equilibrium) between the etalon 15 and the annular receiving structure 31 is provided by thermally conductive copper braids 40, each of which extends between a surface portion of the ring 30 and a corresponding surface portion of the receiving structure 31. As illustrated in FIGS. 5 and 6, one end portion of each of three braids 40 is bonded to a corresponding cylindrical surface portion of the ring 30 by a thermally conductive epoxy. The three braids 40 are bonded to the ring 30 at specified intervals from each other around the circumference of the ring. Each of the braids 40 extends through a corresponding one of three equally spaced apertures 41 through the cylindrical wall of the receiving structure 31, and the other end of each of the braids 40 is bonded to the outer cylindrical surface of the receiving structure by a thermally conductive epoxy.

A description of a particular embodiment of a rugged interferometer in accordance with the present invention has been presented. However, practitioners skilled in the art, upon perusal of the foregoing specification and accompanying drawing, would be able to devise other embodiments. Thus, the description presented herein is to be understood as illustrative of the invention, which is more generally defined by the following claims and their equivalents.

I claim:

1. An interferometer for producing a series of spectrally narrow channels centered on a selected infrared wavelength, said interferometer comprising:
   (a) a single-crystal substrate having a refractive index greater than 3.4, said substrate having first and second sides that are parallel to each other within a proper fraction of said selected wavelength;
   (b) two dielectric stacks identified as the first stack and the second stack, each of said stacks comprising a plurality of layers made of different dielectric materials, said two dielectric stacks being substantially identical to each other, the layers of said first stack being coated one over another on the first side of said substrate, the layers of said second stack being coated one over another on the second side of said substrate, each of said dielectric stacks providing an internal reflectivity of greater than 90% for said substrate at said selected wavelength; and
   (c) means for mounting said substrate so as to be able to withstand thermal cycling between aabient terrestrial temperature and temperatures lower than 20° Kelvin.

2. The interferometer of claim 1 wherein said substrate is made of single-crystal silicon.

3. The interferometer of claim 2 wherein each of said layers has a thickness of substantially one-quarter of said selected wavelength.

4. A Fabry-Perot interferometric apparatus comprising:
   (a) an interferometer for producing a series of spectrally narrow channels of electromagnetic radiation centered on a selected infrared wavelength, said interferometer comprising:
      (i) a single-crystal substrate having a refractive index greater than 3.4, said substrate having first and second sides that are parallel to each other within a proper fraction of said selected wavelength;
      (ii) two dielectric stacks identified as the first stack and the second stack, each of said stacks comprising a plurality of layers made of different dielectric materials, said two dielectric stacks being substantially identical to each other, the layers of said first stack being coated one over another on the first side of said substrate, the layers of said second stack being coated one over another on the second side of said substrate, each of said dielectric stacks providing an internal reflectivity of greater than 90% for said substrate at said selected wavelength; and (iii) means for mounting said substrate so as to be able to withstand thermal cycling between ambient terrestrial temperature and temperatures lower than 20° Kelvin; and (b) a spectral filter means for isolating a selected channel from said series of channels of electromagnetic radiation.

5. The apparatus of claim 4 further comprising means for collimating infrared radiation incident upon said interferometer.

6. The apparatus of claim 5 further comprising means for controllably tilting said interferometer relative to said infrared radiation incident thereon so that said series of channels of radiation can be investigated in order to select a particular channel for isolation.

7. A fabry-Perot interferometric apparatus comprising:

(a) an interferometer for producing a series of spectrally narrow channels of electromagnetic radiation centered on a selected infrared wavelength, said interferometer comprising:

(i) a single-crystal substrate having first and second sides that are parallel to each other within a proper fraction of said selected wavelength;

(ii) two dielectric stacks identified as the first stack and the second stack, each of said stacks comprising a plurality of layers made of different dielectric materials, said two dielectric stacks being substantially identical to each other, the layers of said first stack being coated one over another on the first side of said substrate, the layers of said second stack being coated one over another on the second side of said substrate, each of said dielectric stacks providing an internal reflectivity of greater than 90% for said substrate at said selected wavelength; and (iii) means for mounting said substrate, wherein said mounting means comprises:

(A) a dielectric ring, said ring and said substrate being made of the same material, said ring being bonded to a peripheral portion of said first side of said substrate by a bonding material having a coefficient of thermal expansion substantially equal to the coefficient of thermal expansion of said material of which said ring and said substrate are made;

(B) an annular metallic receiving structure for receiving said dielectric ring, said receiving structure having a ledge that extends inwardly toward the center of said receiving structure;

(C) a first set of three flexible contact members, the three contact members of said first set being substantially identical to each other, the three contact members of said first set being secured to said ledge and equally spaced with respect to each other on said ledge, the three contact members of said first set separating said ring from said receiving structure when said substrate and said ring are received by said receiving structure;

(D) three elongate spring members, one end of each spring member being secured to said receiving structure, a distal end of each spring member projecting inwardly toward the center of said receiving structure, the three spring members being substantially identical to each other and equally spaced with respect to each other on said receiving structure; and (E) a second set of three flexible contact members, the three contact members of said second set being substantially identical to each other, each contact member of said second set being secured to a corresponding one of said spring members, the three contact members of said second set compressively contacting said substrate; and (b) a spectral filter means for isolating a selected channel from said series of channels of electromagnetic radiation.

8. The apparatus of claim 7 wherein each of said contact members has a substantially hemispheric portion, and wherein the hemispheric portion of each of the contact members of said first set makes substantially kinematic contact with said ring, and wherein the hemispheric portion of each of the contact members of said second set makes substantially kinematic contact with said substrate.

9. The apparatus of claim 7 wherein each of said contact members is made of polytetrafluoroethylene.

10. The apparatus of claim 7 further comprising means for maintaining said substrate and said receiving structure at thermal equilibrium with respect to each other, said means including a plurality of metallic braids, one end of each braid being bonded to the surface of said ring, the other end of each braid being bonded to the surface of said receiving structure.

11. The apparatus of claim 10 wherein each one of said braids extends from the surface of said ring through an aperture in said receiving structure to the surface of said receiving structure.

12. A rugged interferometric apparatus comprising:
a) an interferometer for producing a series of (a) an interferometer for producing a series of spectrally narrow channels of electromagnetic radiation centered on a selected infrared wavelength, said interferometer comprising:

(i) a crystal substrate having first and second sides that are parallel to each other within a proper fraction of said selected wavelength;

(ii) two dielectric stacks identified as the first stack and the second stack, each of said stacks comprising a plurality of layers made of different dielectric materials, said two dielectric stacks being substantially identical to each other, the layers of said first stack being coated one over another on the first side of said substrate, the layers of said second stack being coated one over another on the second side of said substrate, each of said dielectric stacks providing an internal reflectivity of greater than 90% for said substrate at said selected wavelength; and (iii) means for mounting said substrate so as to be able to withstand thermal cycling between ambient terrestrial temperature and temperatures lower than 50° Kelvin, said means including:

(A) a dielectric ring, said ring and said substrate being made of the same material, said ring being bonded to a peripheral portion of said first side of said substrate by a bonding material having a coefficient of thermal expansion substantially equal to the coefficient of thermal expansion of said material of which said ring and said substrate are made;

(B) an annular metallic receiving structure for receiving said dielectric ring, said receiving structure having a ledge that extends inwardly toward the center of said receiving structure;

(C) a plurality of flexible contact members comprising a set identified as the first set, the contact members of said first set being secured to said ledge, the contact members of said first set separating said ring from said ledge of said receiving structure and supporting said ring kinematically;

(D) a plurality of elongate spring members, one end of each spring member being secured to said receiving structure, a distal end of each spring member projecting inwardly toward the center of said receiving structure; and (E) a plurality of flexible contact members comprising a set identified as the second set, each contact member of said second set being secured to a corresponding one of said spring members, the contact members of said second set making compressive contact with said substrate; and (b) a spectral filter means for isolating a selected channel from said series of channels of electromagnetic radiation.

13. The apparatus of claim 12 wherein the substrate of said interferometer is made of single-crystal silicon.

14. The apparatus of claim 12 wherein said first set of flexible contact members comprises three contact members, each contact member of said first set having a head portion secured to said ledge and a shaft portion projecting away from the head portion, the shaft portion having a hemispherical distal end, said hemispherical distal end of each shaft portion making single-point contact with said ring.

15. The apparatus of claim 14 comprising three spring members, said three spring members being equally spaced with respect to each other on said receiving structure.

* * * * *